US012538119B1

(12) United States Patent
Cooper et al.

(10) Patent No.: US 12,538,119 B1
(45) Date of Patent: Jan. 27, 2026

(54) ENHANCED MOBILE PRIVACY WITH CODE WORDS

(71) Applicant: UIPCO, LLC, San Antonio, TX (US)

(72) Inventors: Nina Cooper, San Antonio, TX (US); Mark Paxman Warnick, San Antonio, TX (US); Courtney St. Martin, Duluth, GA (US); Megan Sarah Jennings, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 248 days.

(21) Appl. No.: 18/068,733

(22) Filed: Dec. 20, 2022

Related U.S. Application Data

(60) Provisional application No. 63/266,067, filed on Dec. 28, 2021.

(51) Int. Cl.
*H04W 12/02* (2009.01)
*G06F 21/62* (2013.01)

(52) U.S. Cl.
CPC ........ *H04W 12/02* (2013.01); *G06F 21/6245* (2013.01)

(58) Field of Classification Search
CPC ............................ H04W 12/02; G06F 21/6245
See application file for complete search history.

(56) References Cited

U.S. PATENT DOCUMENTS

| 8,468,584 | B1 * | 6/2013 | Hansen | H04M 3/4936 |
| | | | | 713/169 |
| 9,256,457 | B1 * | 2/2016 | Leske | H04L 65/1069 |
| 9,881,178 | B1 * | 1/2018 | Brown | H04M 3/5183 |
| 10,025,952 | B1 * | 7/2018 | Wang | G06F 21/84 |
| 11,451,855 | B1 * | 9/2022 | Kirley | G06F 3/147 |
| 2001/0032316 | A1 * | 10/2001 | Lu | H04M 3/493 |
| | | | | 713/182 |

(Continued)

OTHER PUBLICATIONS

"Privacy preserving Voice Module." IP.com Prior Art Database Technical Disclosure. Dec. 27, 2006 [retrieved on Sep. 5, 2025]. Retrieved from the internet <URL: https://priorart.ip.com/IPCOM/000144441> (Year: 2006).*

*Primary Examiner* — Michael Simitoski
*Assistant Examiner* — Zhe Liu
(74) *Attorney, Agent, or Firm* — Plumsea Law Group, LLC

(57) ABSTRACT

A system and method for codeword substitution are provided. Embodiments provide a way to enhance privacy when communicating over the phone. A user has predefined codewords that map to various kinds of sensitive information that they would prefer not to say audibly on the phone. When the user is on the phone and asked to give the sensitive information, the system would detect the codeword while muting the codeword and automatically provide the sensitive information to the provider on the other end. Anyone near the member would be unable to hear this sensitive information. The system may include a codeword setup module to associate codewords with sensitive information, a codeword detecting module to identify codewords, and a codeword substitution module to provide the sensitive information over the phone when the codewords are detected. This approach keeps the sensitive information safe from eavesdroppers.

20 Claims, 12 Drawing Sheets

(56) References Cited

U.S. PATENT DOCUMENTS

| | | | |
|---|---|---|---|
| 2009/0036095 A1* | 2/2009 | Bickerstaff | G06F 21/41 |
| | | | 455/411 |
| 2013/0132091 A1* | 5/2013 | Skerpac | G07C 9/37 |
| | | | 704/273 |
| 2014/0095153 A1* | 4/2014 | de la Guardia Gonzales | ............ |
| | | | G10L 25/48 |
| | | | 704/E21.001 |
| 2015/0161989 A1* | 6/2015 | Hsu | G10L 15/08 |
| | | | 704/251 |
| 2018/0032755 A1* | 2/2018 | Odinak | G06Q 30/016 |
| 2019/0392176 A1* | 12/2019 | Taron | G06F 21/32 |
| 2020/0175209 A1* | 6/2020 | Yost | G06F 21/84 |
| 2020/0310746 A1* | 10/2020 | Kopparapu | G10L 21/06 |
| 2021/0389924 A1* | 12/2021 | Chong | H04W 12/02 |

\* cited by examiner

ENHANCED MOBILE PRIVACY WITH CODE WORDS

CROSS-REFERENCE TO RELATED APPLICATIONS

This application claims the benefit of U.S. Provisional Patent Application Ser. No. 63/266,067 filed on Dec. 28, 2021 and titled "Enhanced Mobile Privacy with Codewords." The disclosure of which is incorporated by reference in its entirety.

TECHNICAL FIELD

The present disclosure generally relates to enhancing privacy when communicating over the phone. The present disclosure more specifically relates to a method and system for using codewords to substitute for private information when a user communicates with an entity over the phone, such as a service provider. During a phone conversation, a user may need to provide such an entity with private, confidential, and/or sensitive information. Accordingly, it may be desirable to share the information without uttering the actual information out loud. Such an approach may avoid having an eavesdropper overhear the information.

BACKGROUND

During a conversation, a user may wish to share personal information with an entity on the other end of the conversation. For example, a health insurance provider may require a Social Security number to verify a user's identity. Likewise, a merchant may require a credit card number as a means of payment.

However, the user may wish to keep the actual content of the personal information private. Uttering the content out loud creates a security risk, in that the uttered content may be overheard by an eavesdropper. If a malicious actor gains improper access to the user's information, the malicious actor may commit identity theft or otherwise misuse the information. For example, an eavesdropper may use a Social Security number to access confidential medical information. As another example, an eavesdropper may use a credit card number to make a fraudulent purchase. Because of the risk of interception, it is dangerous for a user to actually supply personal information over the phone. However, personal information is still necessary to establish access privileges, authenticate the user, or otherwise facilitate transactions and information access.

There is a need in the art for a system and method that addresses the shortcomings discussed above.

SUMMARY

In one aspect, a codeword substitution system includes at least one processor configured to prompt a user for a codeword at a phone. The at least one processor is further configured to receive the codeword from the user at the phone. The at least one processor is further configured to recognize the codeword. The at least one processor is further configured to map the recognized codeword to sensitive information. The at least one processor is further configured to generate audio corresponding to the sensitive information. The at least one processor is further configured to transmit the audio over the phone to a service provider.

In another aspect, a codeword substitution method is disclosed. The method includes a first step of prompting a user for a codeword at a phone. The method also includes a second step of receiving the codeword from the user at the phone. The method also includes a third step of recognizing the codeword. The method also includes a fourth step of mapping the recognized codeword to sensitive information. The method also includes a fifth step of generating audio corresponding to the sensitive information. Finally, the method also includes a sixth step of transmitting the audio over the phone to a service provider.

In another aspect, a codeword substitution method is disclosed. The method includes a first step of listening to a user for a user signal for a codeword at a phone. The method also includes a second step of receiving the codeword from the user at the phone. The method also includes a third step of recognizing the codeword. The method also includes a fourth step of mapping the recognized codeword to sensitive information. The method also includes a fifth step of generating audio corresponding to the sensitive information. Finally, the method also includes a sixth step of transmitting the audio over the phone to a service provider.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Embodiments provide systems and methods for improving privacy when interacting with an entity over the phone. Such an entity may be a provider of a service to a user that requires sensitive or personal information from the user. The entity may require such information to identify the user, to authorize payment, or to help the user in ways that require sensitive information. For example, a government agency may desire to identify a user when providing the user with tax information. A merchant may desire a credential such as a credit card number (and related information, such as an expiration date and a card verification value (CVV) code), when a user is making a purchase. A health insurer or health care provider may desire sensitive medical information when treating a patient.

For purposes of this application, the term "provider" is used to refer to an entity, organization, or provider with which the user interacts over a phone call, such that the provider has a legitimate need for information related to the user that should be kept secret. Examples of providers include insurance companies, banks, health care providers, merchants and so on. Thus, in the proposed embodiments, the user conducts a phone call with a provider.

For purposes of this application, the term "private information" is used to refer to information that the user wishes to keep a secret. Such information may be sensitive information of various types. For example, the private information could refer to information that, if misused, could jeopardize the user in various ways. For example, a stolen Social Security Number could lead to identity theft, or a medical history of certain diagnoses could lead to stigma. Other information could be used to blackmail the user or lead to another invasion of the user's privacy.

Embodiments apply systems and methods in which a user communicates with a provider over the telephone. For example, the user may be a member of an insurance company, or a customer of a business. The user may wish to share sensitive personal information with the provider. However, an eavesdropper may overhear or steal such information. Then, the eavesdropper may use the sensitive personal information improperly.

Embodiments provide a solution in which the user substitutes a codeword for actual information. For example, a user says "Marshmallow" instead of a Social Security Number, such as 123-45-6789. Hence, an eavesdropper cannot determine the actual data. Preferably, the codeword is chosen so that it has no relationship to the actual data that would make it easy to guess the actual data. Embodiments may also include additional protection, such as two-factor authentication, calling from a specific phone number, a voiceprint, and so on. Such additional protection helps ensure that the codeword is not intercepted and misused.

Figure 1:
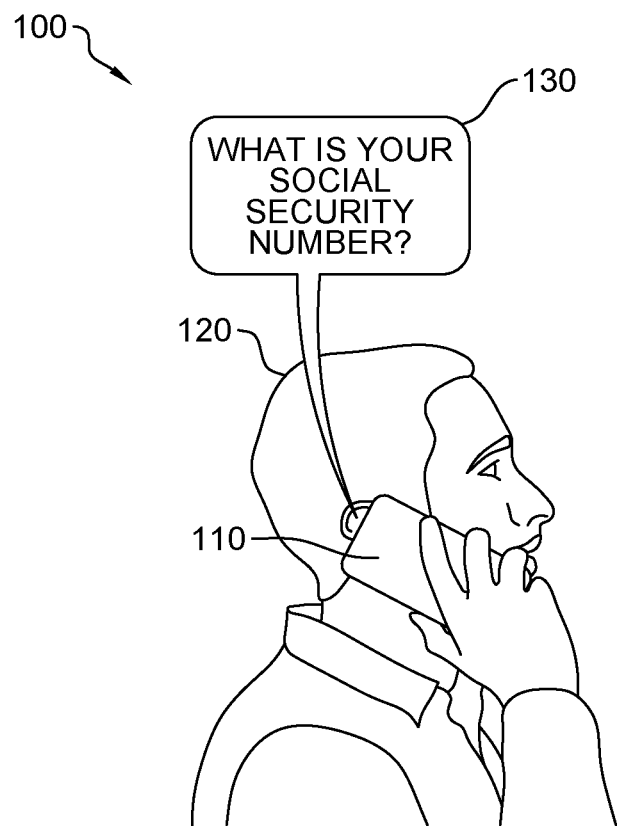
FIG. 1 shows a user interface diagram of a user interacting with a provider using a smartphone, according to an embodiment.
Figure 2:
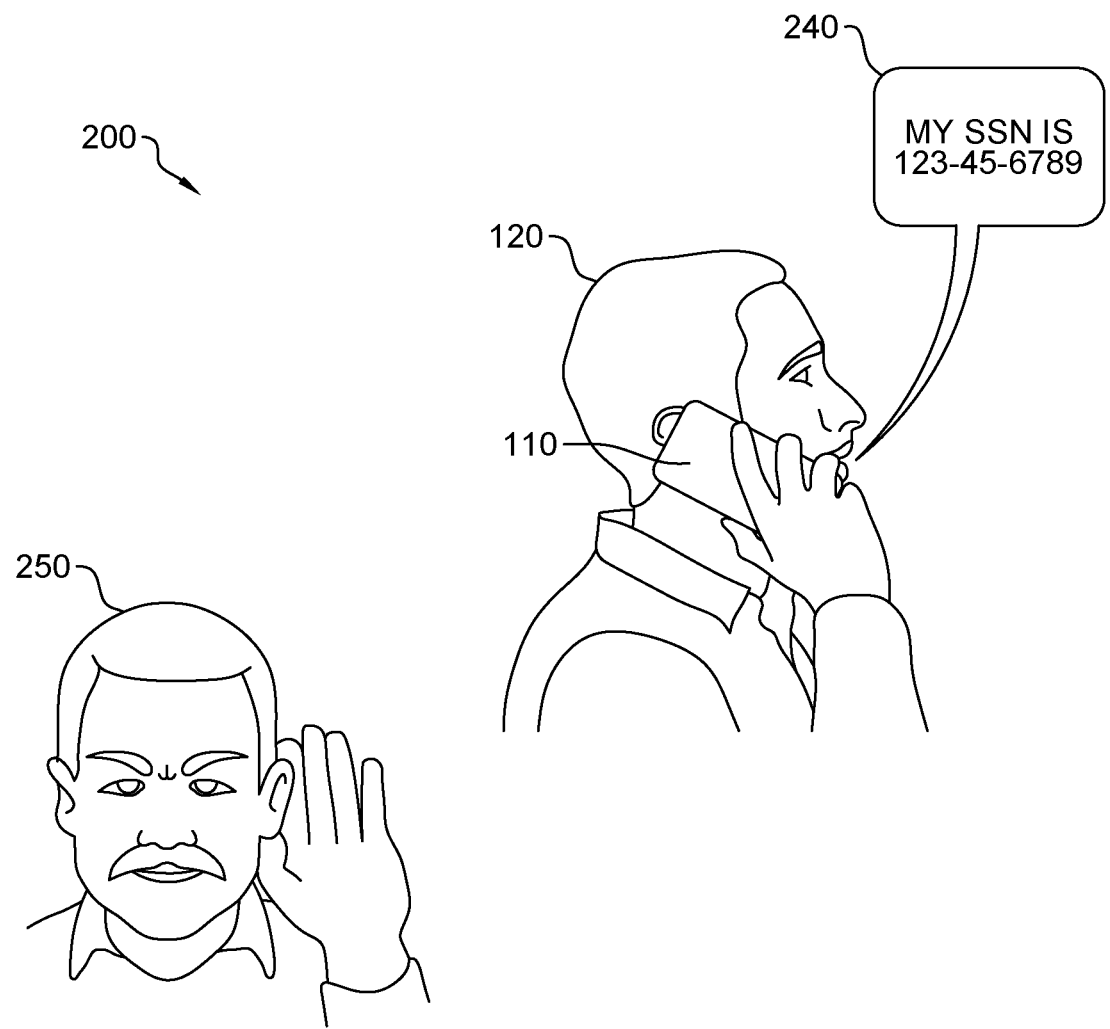
FIG. 2 shows a user interface diagram of a user interacting with a provider using a smartphone, according to an alternative technology.

FIG. 1 shows a user interface diagram 100 of a user interacting with a provider using a smartphone, according to an embodiment. FIG. 2 shows a user interface diagram 200 of a user interacting with a provider using a smartphone, according to an alternative technology.

FIG. 1 shows a user 120 interacting with a smartphone 110. While examples are presented in accordance with a smartphone 110, it is to be recognized that embodiments may also operate in the context of other types of phones, such as feature phones, cordless phones, and corded phones, with appropriate modifications. The smartphone 110 prompts the user 120 for a Social Security Number. For example, the smartphone 110 prompts "What is your Social Security Number?" at 130. While FIG. 1 shows the smartphone 110, other devices may take on the role of the smartphone 110, such as a smart watch or other wearable, a tablet computer, a portable digital assistant (PDA), music player, and so on, where the device is able to receive audio from the user 120 and use the received audio as a basis for recognizing codewords.

FIG. 1 shows an audible prompt. Here, the user 120 may be in communication with a provider. As discussed above, the provider may be an entity that needs to confirm an identity of the user 120. The provider may use the Social Security Number to confirm that the user 120 is legitimate. Traditional approaches require the user 120 to actually recite the Social Security Number out loud over the phone, as shown in the embodiment of FIG. 2. For example, the user 120 says "My Social Security Number is 123-45-6789."

Reciting sensitive information, such as a Social Security Number, out loud causes significant problems. An eavesdropper 250 as shown in FIG. 2 may overhear the number and also infer that the number is a Social Security Number. For example, the user 120 may say three numbers, followed by a pause, followed by two numbers, followed by another pause, followed by four numbers. Such a format corresponds to that of a Social Security Number. If the eavesdropper 250 steals a Social Security Number with enough supporting information, the eavesdropper 250 may commit identity theft or other fraud.

For example, the eavesdropper 250 may have access to basics of the user's identity, such as the user's name. Once the eavesdropper 250 knows a user's name, the eavesdropper 250 may perform research to gain access to publicly available information about a user, such as the user's address and phone number, as well as other publicly available information such as birth date information available on the Internet, such as by using social networks or by performing web searches. By pairing Social Security Number information with this additional user information, identity theft and other fraud become possible. Embodiments provide alternatives to avoid such identity theft. In particular, it becomes possible to avoid identity theft because the actual private information is not exposed directly to the eavesdropper 250.

Figure 3:
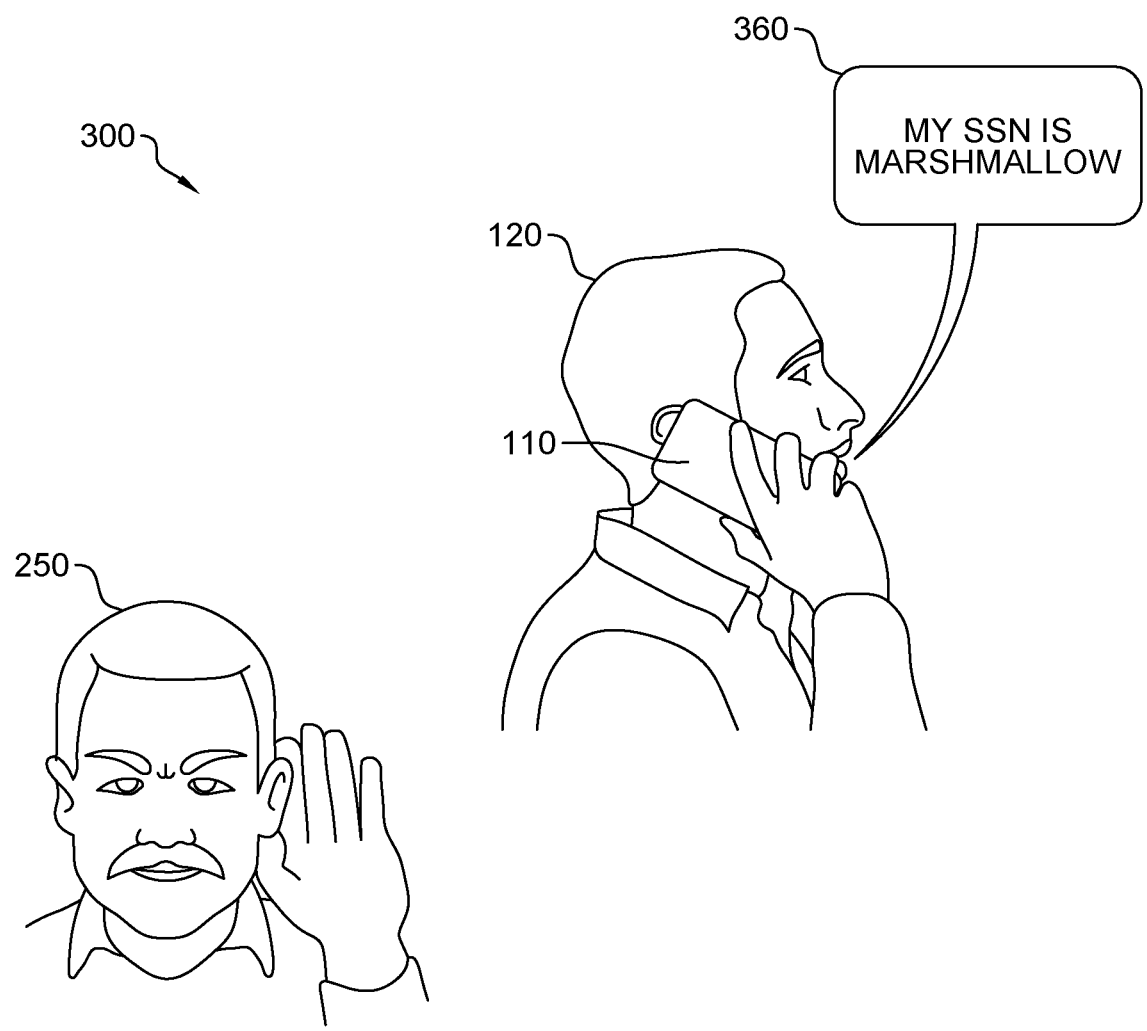
FIG. 3 shows a user interface diagram of a user interacting with a provider using a smartphone, according to an embodiment.

FIG. 3 shows a user interface diagram 300 of a user interacting with a provider using a smartphone, according to an embodiment. In FIG. 3, the user 120 uses a solution provided for in embodiments. In FIG. 3, the user 120 substitutes a codeword for sensitive information. For example, in FIG. 3, the user 120 says the phrase "My Social Security Number is Marshmallow" 360. Here, "Marshmallow" is a codeword previously associated with a Social Security Number (for example, 123-45-6789) of the user 120. In an embodiment, the smartphone 110 continuously listens for the codeword.

Thus, the smartphone 110 automatically takes steps to share Social Security Number information whenever the smartphone 110 detects the codeword "Marshmallow" and then attempts to understand the context so it can understand why the user 120 wants to map "Marshmallow" to "123-45-6789." For example, the smartphone 110 may receive "Marshmallow" and then realize that the provider just requested a Social Security Number to verify that the user 120 should have access to information about his or her 401k account from a provider.

Alternatively, the smartphone 110 uses a trigger phrase or word, such as "Hey Siri," "OK, Google," "Alexa," etc.

Alternatively, the smartphone 110 only listens for the codeword when specifically prompting for personal information. For example, the smartphone 110 may specifically listen for "Marshmallow" when it is prompting for a Social Security Number of a user that is presently calling. Because "Marshmallow" is the codeword, the smartphone may ignore "My Social Security Number is" or may interpret "My Social Security Number is" to recognize that the codeword "Marshmallow" is intended to be associated with a Social Security Number. Thus, when providing the codeword, the user 120 specifies, at least, the codeword, but may provide context to help the smartphone 110 identify the nature of the codeword.

FIG. 3 also shows the eavesdropper 250. Here, all the eavesdropper 250 hears is "My Social Security Number is Marshmallow." Thus, while the eavesdropper 250 may be aware that the user 120 is providing a Social Security Number, the eavesdropper 250 does not overhear the actual digits in the Social Security Number. Alternatively, it may be possible to use a codeword for the category as well. For example, the user 120 may say "My Trumpet is Marshmallow." Here, Trumpet means Social Security Number, and Marshmallow maps to the actual Social Security Number of the user 120. By using a codeword for the category, it may signal what information is to be provided without giving a clue to the eavesdropper 250. Preferably, the codewords are chosen so that they do not give any clues to the eavesdropper 250. For example, "independence" would be a problematic codeword for a birthday of July 4, in that the eavesdropper 250 could potentially guess the birthday if the user 120 says "My Birthday is Independence."

Figure 4:
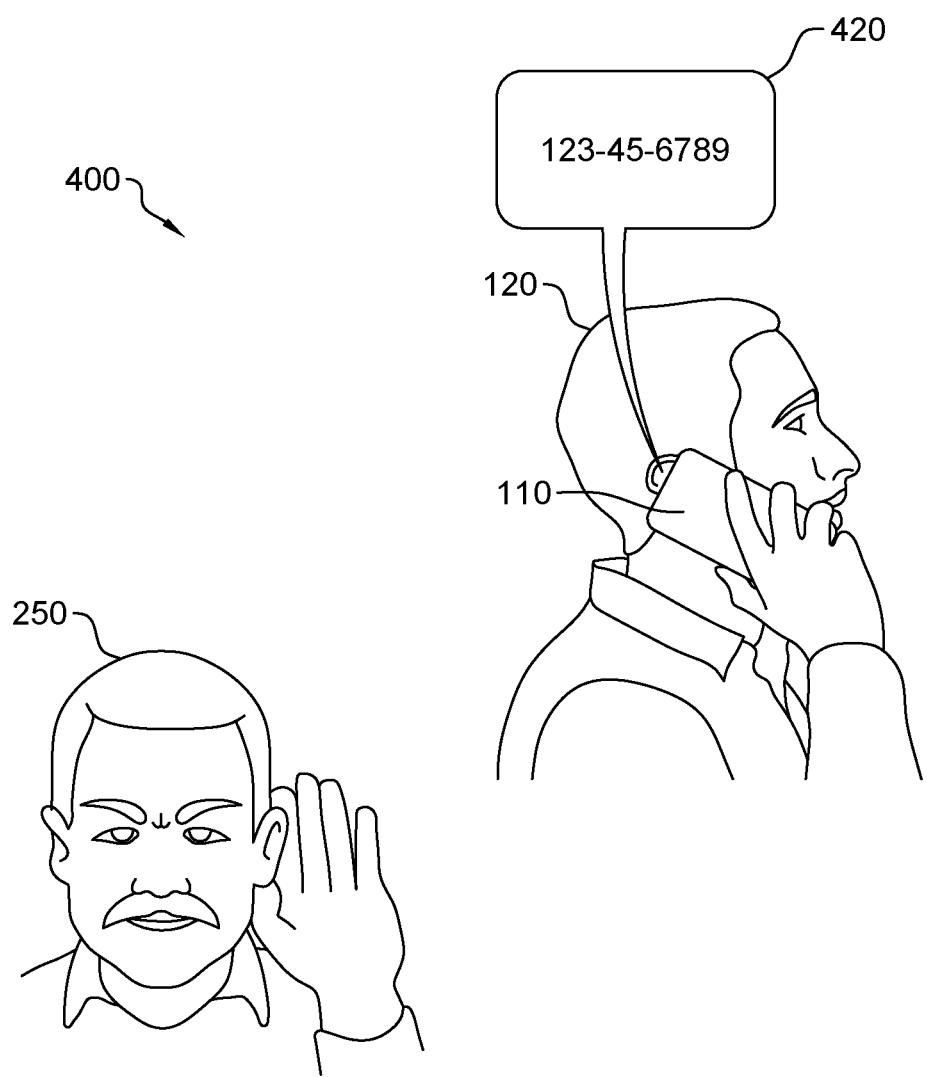
FIG. 4 shows a diagram of a smartphone substituting private information for a codeword, according to an embodiment.

FIG. 4 shows a diagram 400 of a smartphone substituting private information for a codeword, according to an embodiment. At FIG. 4, the user 120 has said the appropriate codeword. Thus, the smartphone 110 infers that the user 120 wishes to substitute the actual information for the codeword. The smartphone 110 thus sends the Social Security Number (123-45-6789) to the provider. The smartphone 110 may mute the phone line in a way that the provider does not hear the codeword, but instead only hears the Social Security Number it actually needs. Thus, only the user 120 will possess the codeword, and the provider will not be able to allow other users or eavesdroppers to fraudulently use the codeword.

The smartphone 110 may detect the codeword in a number of ways. The smartphone 110 continuously listens for the codeword or specifically listens for the codeword when prompting for the linked information. As another alternative, the user 120 may use an activating phrase, such as "Hey Siri," "OK Google," or "Alexa," as provided in various mobile operating systems such as IOS, ANDROID, and devices that use AMAZON ALEXA. After detecting the codeword, the smartphone 110 recognizes a codeword, maps the codeword, and provides actual data to the other party. In FIG. 4, the smartphone 110 realizes that it is necessary to substitute the actual Social Security Number information and does so. The smartphone 110 provides audio 470 including the actual Social Security Number information 470.

Such audio including the actual Social Security Number information 470 may be provided by using a recording of the user 120 reading his or her Social Security Number information. Alternatively, the audio including the actual Social Security Number information 470 may be provided by using the Social Security Number and using text-to-speech software to generate the audio including actual Social Security Number information 470. In some embodiments, the audio including the sensitive information is transmitted so that the provider receives the audio but the user 120 does not hear the audio at the smartphone 110. Thus, not only is the speech uttered by the user 120 not audible by an eavesdropper 250, but the eavesdropper 250 also cannot hear the audio including the actual Social Security Number information 470.

Figure 5:
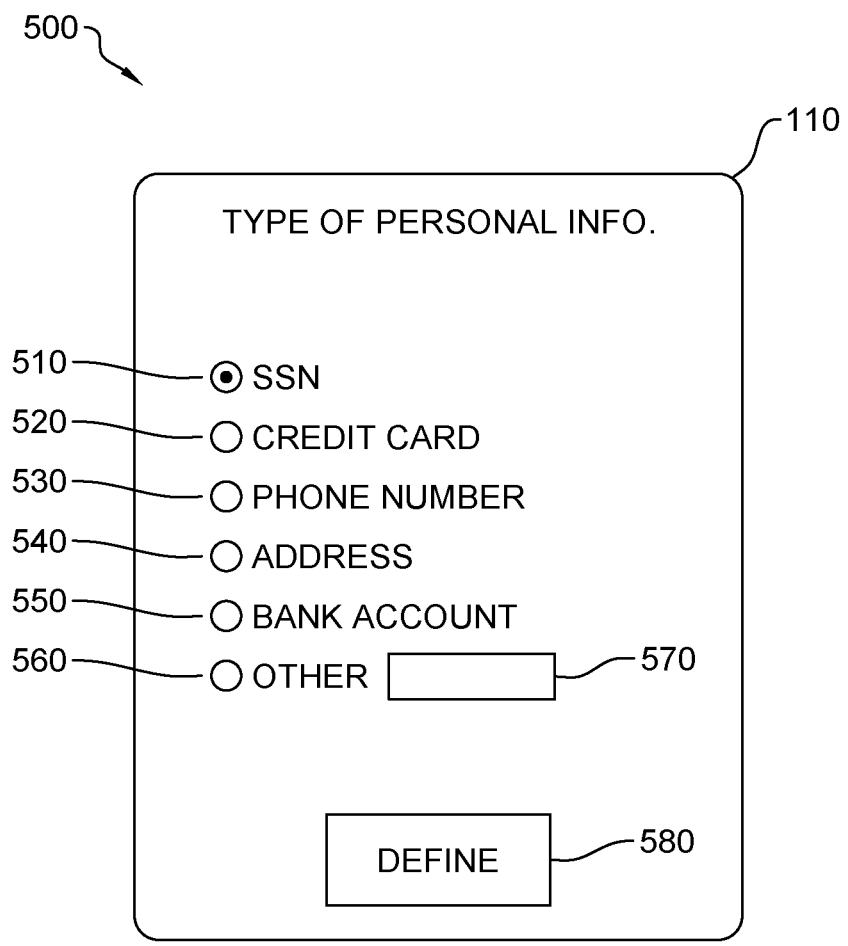
FIG. 5 shows a diagram of a user interface for choosing which type of personal information to substitute for, according to an embodiment.

FIG. 5 shows a diagram of a user interface 500 for choosing which type of personal information to substitute for, according to an embodiment. For example, FIG. 5 shows a screenshot of smartphone 110. FIG. 5 presents a number of types of personal information, such as Social Security Number 510, Credit Card Number 520, Phone Number 530, Address 540, Bank Account Number 550, and Other 560, which corresponds to a field 570 to define another type of personal information. While these types of personal information are presented as examples, other examples are possible and are used in other embodiments.

Figure 6:
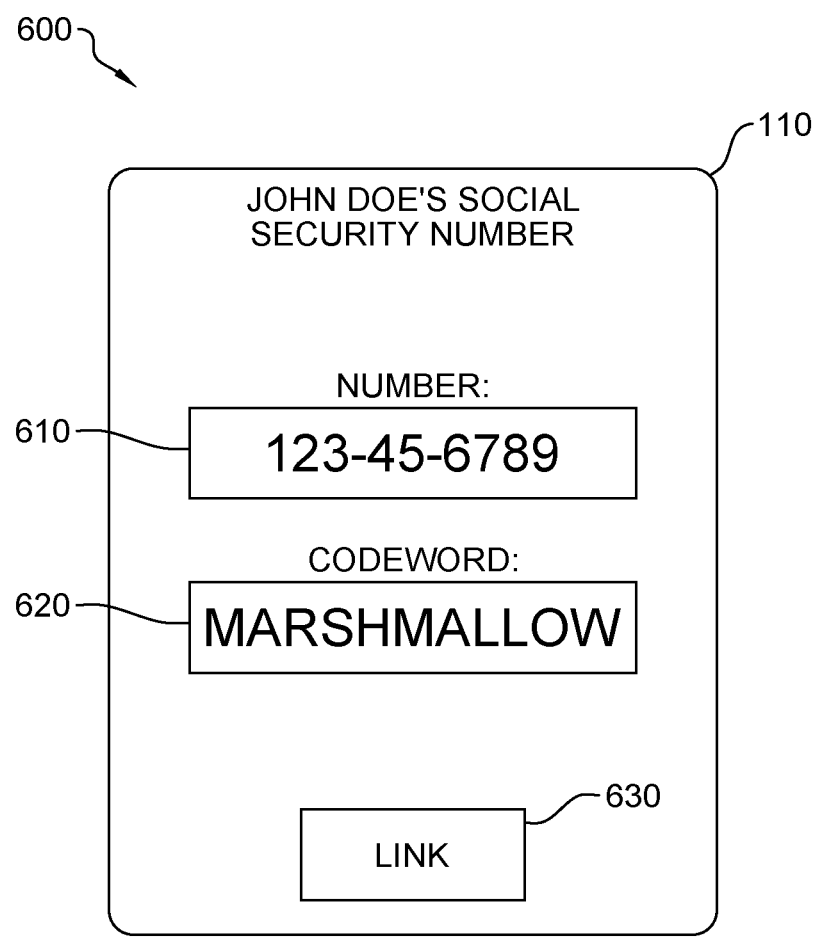
FIG. 6 shows a diagram of a user interface for entering a codeword and the actual data to associate with the codeword, according to an embodiment.

FIG. 6 shows a diagram of a user interface 600 for entering a codeword and the actual data to associate with the codeword, according to an embodiment. FIG. 5 shows the user 120 choosing a particular type of personal information for substitution, such as a credit card number. FIG. 6 provides the user 120 with an interface to enter the personal information, as well as to enter or record codeword to substitute. Preferably, codeword is easy to remember/recognize. Using codeword also increases user convenience (for example, instead of a credit card number, it is easier to remember "Boomerang"). User can also link an arbitrary value with a codeword. Generally, values associated with codewords are alphanumeric. However, it is possible that codewords include symbols, characters in other alphabets, QR codes, or even visual elements.

The codewords may also be used to provide multiple pieces of related data, as well as commands to parse the data. For example, a user could say "Boom Tab Boom Date Tab Boom Code." Here, Boom indicates that the information relates to a credit card of the user 120. Tab is a separator. Hence, this command indicates codewords that stand in for a credit card number, followed by an expiration date, followed by a CVV code. Thus, the command is an elegant way to enter credit card information with increased ease and security. This approach is discussed further with respect to FIG. 12.

Figure 7:
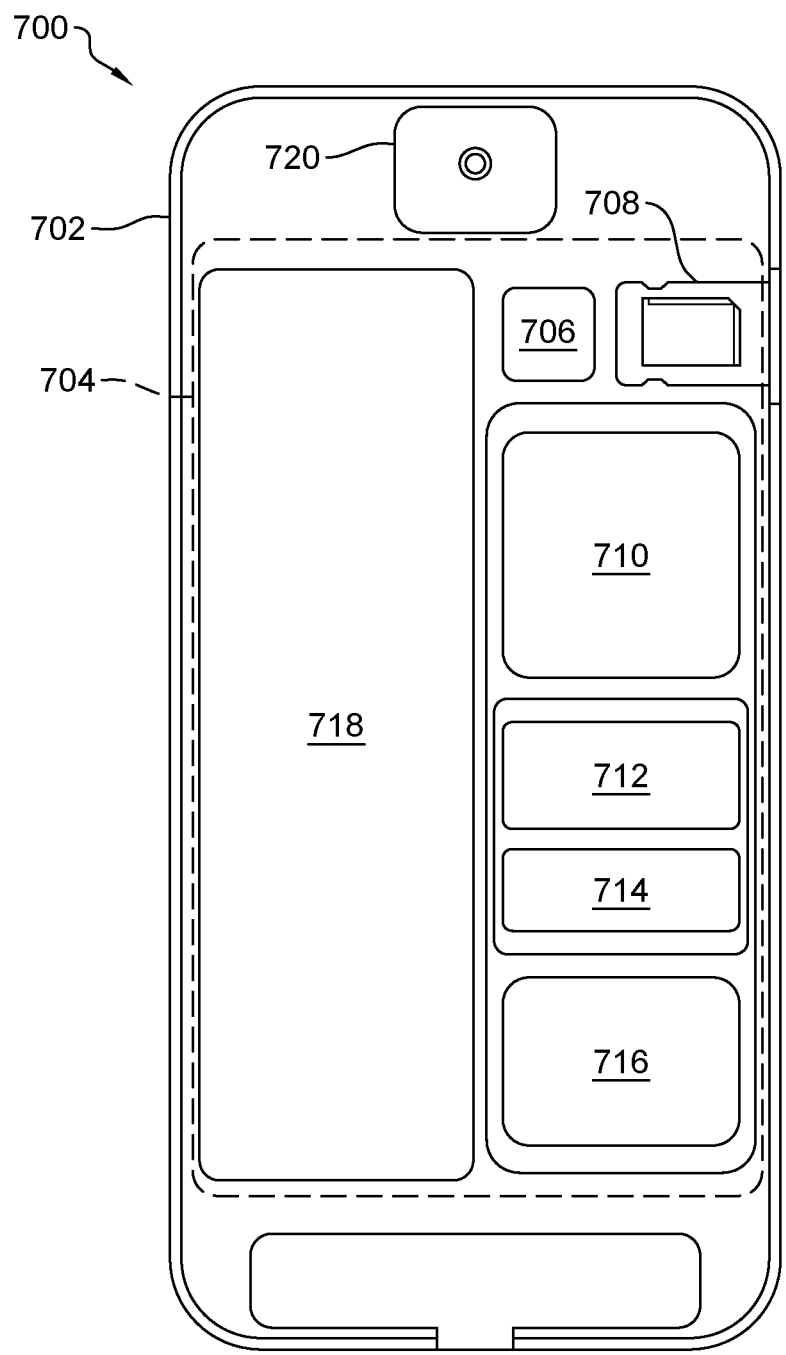
FIG. 7 is a schematic diagram of a mobile device configured to interact with a provider by substituting private information for codewords, according to an embodiment.

FIG. 7 is a schematic diagram 700 of a mobile device configured to interact with a provider by substituting private information for codewords, according to an embodiment.

FIG. 7 is a schematic diagram 700 of a mobile device 702 showing components that may be used in a codeword substitution system in an embodiment. For example, the mobile device 702 may correspond to the smartphone 110. The mobile device 702 includes a display 704. The display 704 may display a user interface for codeword substitution. For example, the display 704 acts as a user interface that a user of the mobile device 702 may use to set associations between codewords and information as shown in FIGS. 5-6. Once the associations are set, the codeword substitution is able to occur.

The mobile device 702 additionally includes a GPS unit 706. Data obtained from the GPS unit 706 allows the mobile device 702 to identify its location, which may be helpful in identifying if a user is allowed to use a codeword or to assess risk of eavesdropping. The mobile device 702 may also include a subscriber identity module (SIM) 708. In some embodiments, the SIM 708 may serve to associate the mobile device 702 with an identity of a user that may establish that the user is qualified to provide certain pieces of information in a codeword substitution method.

The mobile device 702 may also include a processing unit 710 that acts as a control module for the components of the mobile device 702, including the display 704 and a camera 720. In those embodiments in which the mobile device 702 includes a codeword management system itself, the processing unit 710 may also include the codeword management system. In other embodiments, the processing unit 710 merely acts a control module for a separate codeword management system present on the mobile device 702 or in some other device. In other embodiments, the codeword management system is remote, and the mobile device 702 displays interface elements for managing codeword associations and codeword families received from the codeword management system. In such embodiments, processing unit 710 in mobile device 702 may receive communications from the codeword management system so that mobile device 702 may be able to define mappings between codewords and sensitive information for the codeword management system.

The mobile device 702 may also include a connection module 716. The connection module 716 is associated with wired connections to the mobile device 702. For example, the wired connections may be used for charging the mobile device 702 or for making a wired connection between the mobile device 702 and another device. In some embodiments where the codeword management system includes additional cameras to gather images to detect an eavesdropper, a wired connection between the mobile device 702 and one or more additional cameras may be preferred for increased efficiency and speed of eavesdropper identification.

The mobile device 702 further includes a memory 714. In some embodiments, the memory 714 stores information about codewords, sensitive information, mappings between codewords and sensitive information, recordings of sensitive information, and family information. For example, the memory 714 may store the information stored in a codeword information storage 930, as discussed further below.

The mobile device 702 may also include a communication module 712. The communication module 712 is associated with wireless communications (such as WiFi, Bluetooth, near field communication (NFC) technologies, and 3G, 4G or 5G for transmissions over the Internet) and other devices, servers, and databases either local to the vehicle associated with the mobile device 702 or remote to the vehicle. In some embodiments, the communication module 712 thus allows mobile device 702 to wirelessly send and receive information related to codeword substitution so that the mobile device 702 is able to operate as discussed below with respect to FIGS. 8-12.

The mobile device 702 also includes a battery 718 and a camera 720. The battery 718 provides the power source for the mobile device 702. In some embodiments, under the direction of the codeword management system, the camera 720 takes images of the environment of the mobile device 702 which may indicate the presence and extent of an eavesdropper 250.

Figure 8:
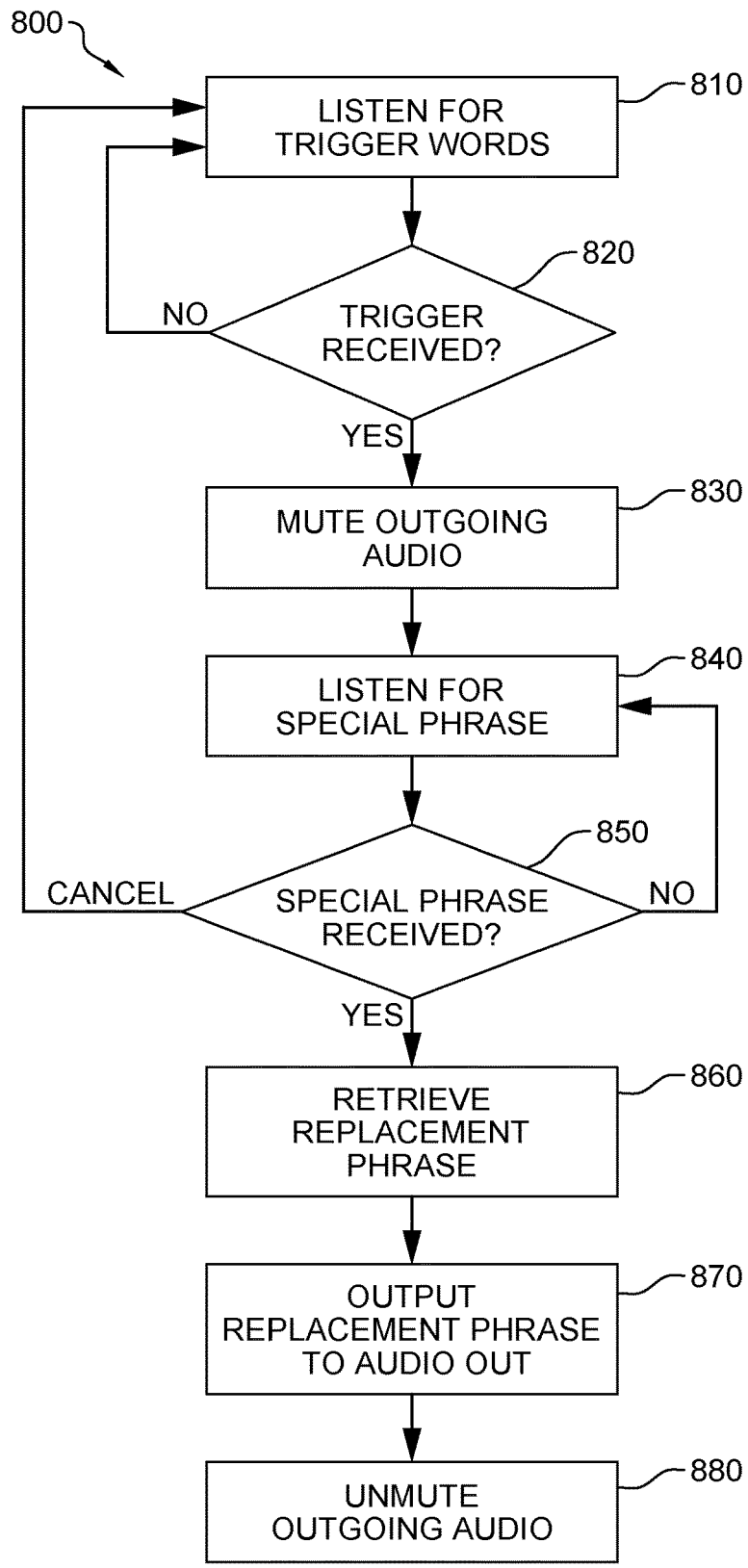
FIG. 8 is a flowchart of a mobile device interacting with a provider over the phone, according to an embodiment.

FIG. 8 is a flowchart 800 of a mobile device interacting with a provider over the phone, according to an embodiment. The method of FIG. 8 shows a first step 810 of listening for a trigger word. For example, such a trigger word may indicate that the mobile device should start listening to audio from a user. Common trigger words in certain mobile operating systems are "Hey Siri," "Alexa," and "OK Google," as discussed above, but these are only examples and users can define their own trigger words in other embodiments. By using specific trigger words to activate the listening, the standby listening may use less power than if a mobile device must constantly listen for any vocal input.

The method of FIG. 8 shows a second step 820 of determining if a trigger word has been received. If so, the method continues to a third step 830. If not, the method returns to the first step 810 to continue to listen for the trigger word. The method of FIG. 8 shows a third step 830 of muting outgoing audio. This third step 830 of muting outgoing audio allows the user to provide a codeword without transmitting the codeword to the provider.

The method of FIG. 8 shows a fourth step 840 of listening for a special phrase. Here, the special phrase corresponds to at least one codeword. The method of FIG. 8 shows a fifth step 850 of determining if the special phrase was received. If so, the method continues to the sixth step 860. If not the method continues to listen for the special phrase in fifth step 850. In the fifth step 850, the user may also opt to cancel the listening, which returns the method to the fifth step 810 of listening for the trigger word. The method of FIG. 8 shows a sixth step 860 of retrieving the replacement phrase. The replacement phrase may be text with the sensitive information or a recording of the user speaking the sensitive information aloud. The method of FIG. 8 shows a seventh step 870 of outputting the replacement phrase to audio out. The outputting may involve transforming the text to audio using text-to-speech functionality or playing a recording of the user saying the replacement phrase. The method of FIG. 8 shows an eighth step 880 of unmuting the outgoing audio. Once the substituted phrase has been transmitted over the phone connection, it is appropriate for the user to continue communicating over the phone normally.

Figure 9:
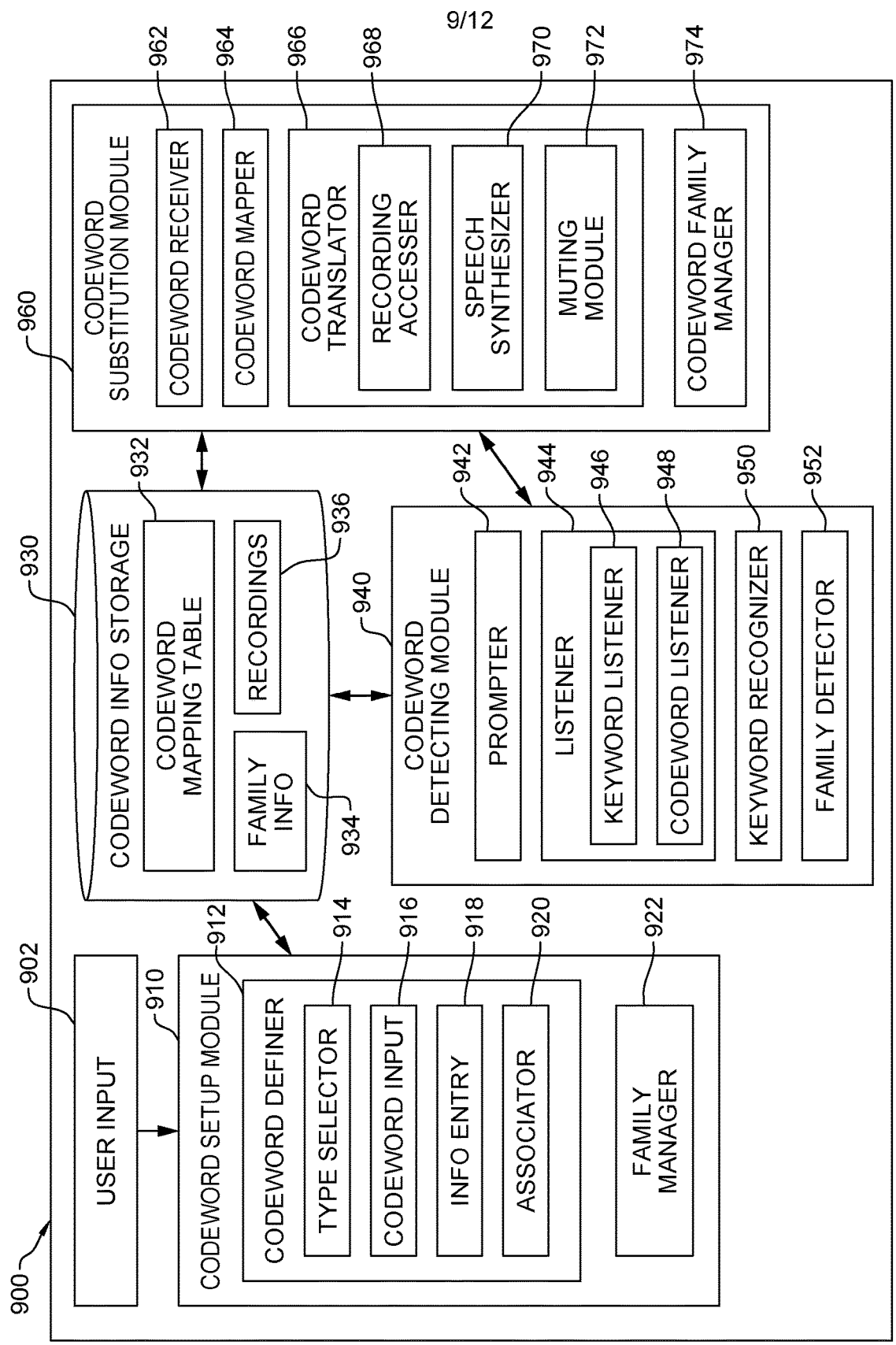
FIG. 9 shows a structural diagram of a codeword management system, according to an embodiment.

FIG. 9 shows a structural diagram of a codeword management system 900, according to an embodiment. For example, the codeword management system 900 receives user input 902. Such user input 902 defines codewords and associates them with sensitive information, as shown in FIGS. 5-6. The user input 902 later provides codewords for recognition and substitution. The user input 902 is provided to a codeword setup module 910. The codeword setup module 910 provides functionality that allows a user to establish relationships between codewords and corresponding sensitive information.

The codeword setup module 910 includes codeword definer 912, which includes type selector 914. The codeword definer 912 provides the ability to establish and map codewords. For example, the type selector 914 allows a user to pick a type of codeword, such as shown in FIG. 5. The codeword definer 912 also includes codeword input element 916 and information entry element 918, and an associator 920. These elements also correspond to FIG. 6, such that the codeword input element 916 allows the user to enter the codeword and the information entry element 918 defines the associated information, which may be text or a recording of text. The associator 920 forms a relationship between the codeword and the associated information and stores the information in codeword information storage 930. The codeword setup module 910 also includes a family manager 922, which manages families of codewords, such as shown and discussed in FIG. 12. For example, the family manager 922 stores information related to a category of codewords and information related to a separator.

Codeword management system 900 also includes codeword information storage 930, which in turn includes a codeword mapping table 932, family information 934, and recordings 936. The codeword mapping table 932 stores a codeword in a table along with associated information and a type corresponding to the associated information. The family information 934 stores information related to a family of codewords. For example, the family information 934 stores a codeword, separators, and related information. The recordings 936 stores audio corresponding to a user speaking the information associated with the codewords. For example, the recordings 936 may include audio of a user reading his or her Social Security Number out loud. Such audio may be replayed when supplying the Social Security Number to the provider.

Codeword management system 900 also includes codeword detecting module 940. The codeword detecting module 940 allows a user to provide the codeword, so the codeword detecting module 940 detects the codeword for subsequent substitution. The codeword detecting module 940 includes a prompter 942 and a listener 944, where the listener 944 includes a keyword listener 946 and a codeword listener 948. The prompter 942 may provide an indication to the user that it is time to provide a keyword and/or a codeword. Here, a keyword refers to a word that begins the recognition process, and a keyword corresponds to a "trigger word" as discussed in FIG. 8.

The codeword detecting module 940 also includes a keyword recognizer 950 and a family detector 952. The keyword recognizer 950 determines that a keyword has been spoken and hence the listening should commence. The family detector 952 determines that codewords and separators related to detecting families of codewords have been uttered and determines information about the codewords and separators for subsequent substitution.

Codeword management system 900 also includes codeword substitution module 960. The codeword substitution module 960 actually substitutes audio provided to a provider in lieu of a codeword. The codeword substitution module 960 includes codeword receiver 962 and codeword mapper 964. The codeword receiver 962 receives the codeword detected by the codeword detecting module 940, and the codeword mapper 964 maps the received codeword based on information from the codeword information storage 930, such as the codeword mapping table 932.

The codeword substitution module 960 also includes a codeword transmitter 966, where the codeword transmitter 966 includes a recording accesser 968, a speech synthesizer 970, and a muting module 972. The codeword transmitter 966 sends audio corresponding to the mapped codeword over the phone for the user. The audio may be provided by using the recording accesser 968 to access a recording, or by using the speech synthesizer 970 to turn text of the mapped information into audio. The muting module 972 mutes the phone while the user is saying the codeword, so the other party does not hear the codeword, but instead hears the substituted audio. The codeword substitution module 960 also includes a codeword family manager 974. Such a codeword family manager 974 may use family information 934 to transform codewords related to a family of codewords into the relevant mapped information.

Figure 10:
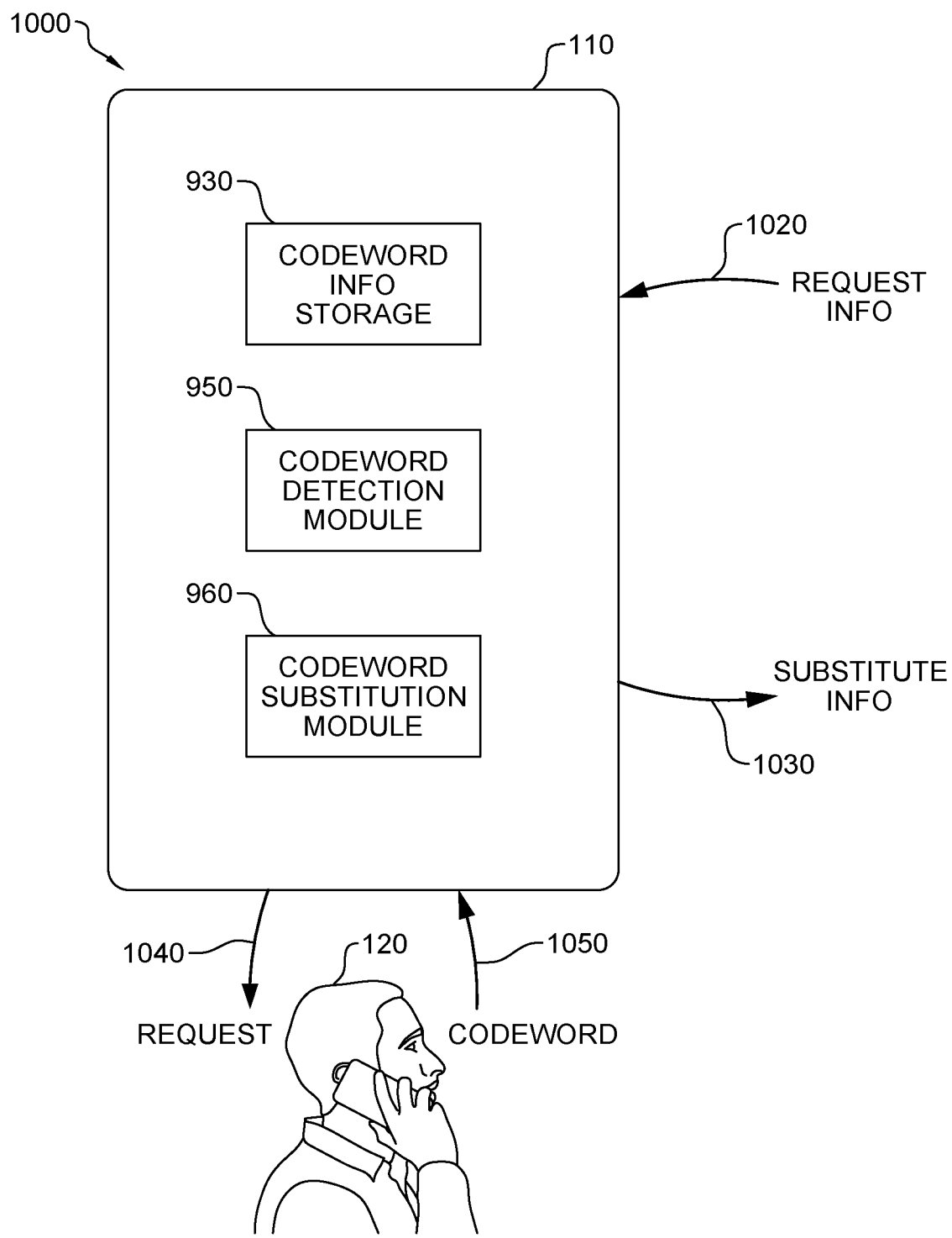
FIG. 10 is a diagram of the operation of a codeword setup module, according to an embodiment.

FIG. 10 is a diagram of the operation of a codeword setup module 1000, according to an embodiment.

FIG. 10 shows mobile device 110 interacting with a provider. The mobile device 110 includes codeword detection module 950 and codeword substitution module 960. The codewords are previously disclosed and stored in codeword information storage 930.

In FIG. 10, a provider prompts user 120 for information using the mobile device 110. For example, the mobile device 110 receives a codeword request 1020 from the provider and in turn requests a codeword 1040 from user 120, receives a codeword 1050 from user 120, and detects that the recited word is a codeword using the codeword detection module 950. The mobile device 110 then finds a substitution using the codeword substitution module 960 to access codeword information storage 930. The mobile device 110 then sends substituted information to provider 1030 using the codeword substitution module 960.

Thus, in FIG. 10, the mobile device 110 requests information 1040 from the user 120 and the user 120 supplies a codeword 1050 to provide an indication of the information that will not provide the information to an eavesdropper.

Figure 11:
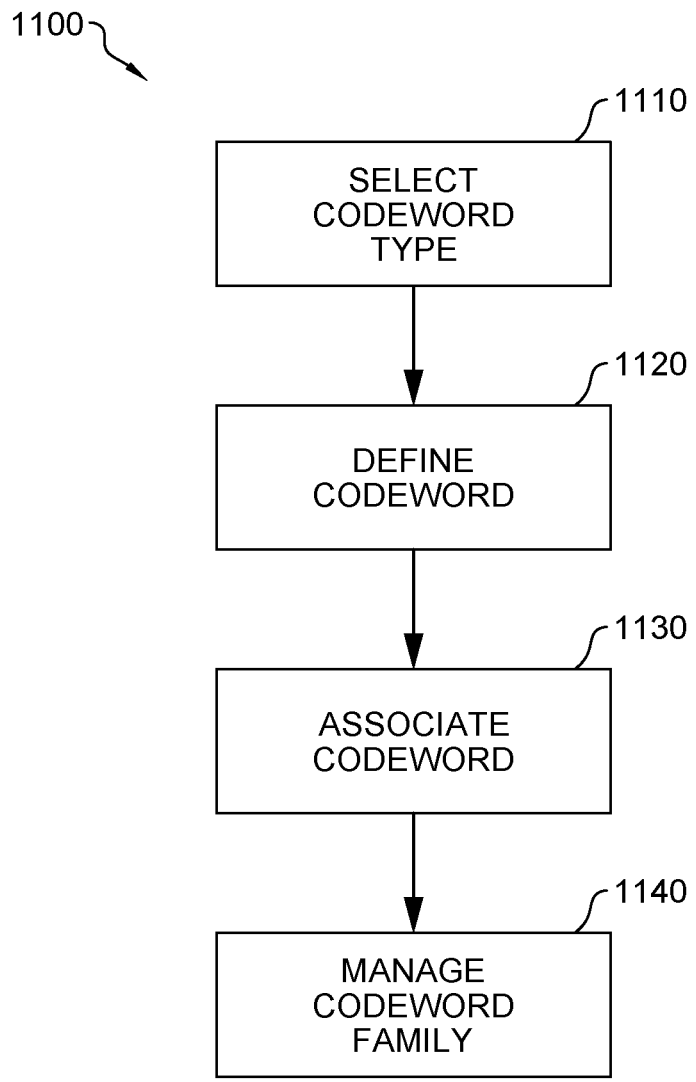
FIG. 11 is a flowchart of the operation of a codeword substitution module, according to an embodiment.

FIG. 11 is a flowchart of a codeword setup method 1100. The method shows how codewords are defined so that they can be later recognized and substituted. The method of FIG. 11 includes a first step 1110 of selecting a codeword type. For example, some types are shown in FIG. 5, such as Social Security Number, Credit Card number, and so on. The method of FIG. 11 includes a second step 1120 of defining a codeword. For example, aspects of such defining are presented in FIG. 6, such as by providing the content of the information, such as a Social Security Number, and a codeword.

The method of FIG. 11 also includes a third step 1130 of associating a codeword. Such a step occurs once the codeword and the associated information have been entered. After the associating, the codeword is mapped to the information to be provided during the phone call. The method of FIG. 11 includes a fourth step 1140 of managing a codeword family. Using a codeword family is shown by way of example in FIG. 12. In a codeword family, related codewords are defined, recognized, and substituted together.

Figure 12:
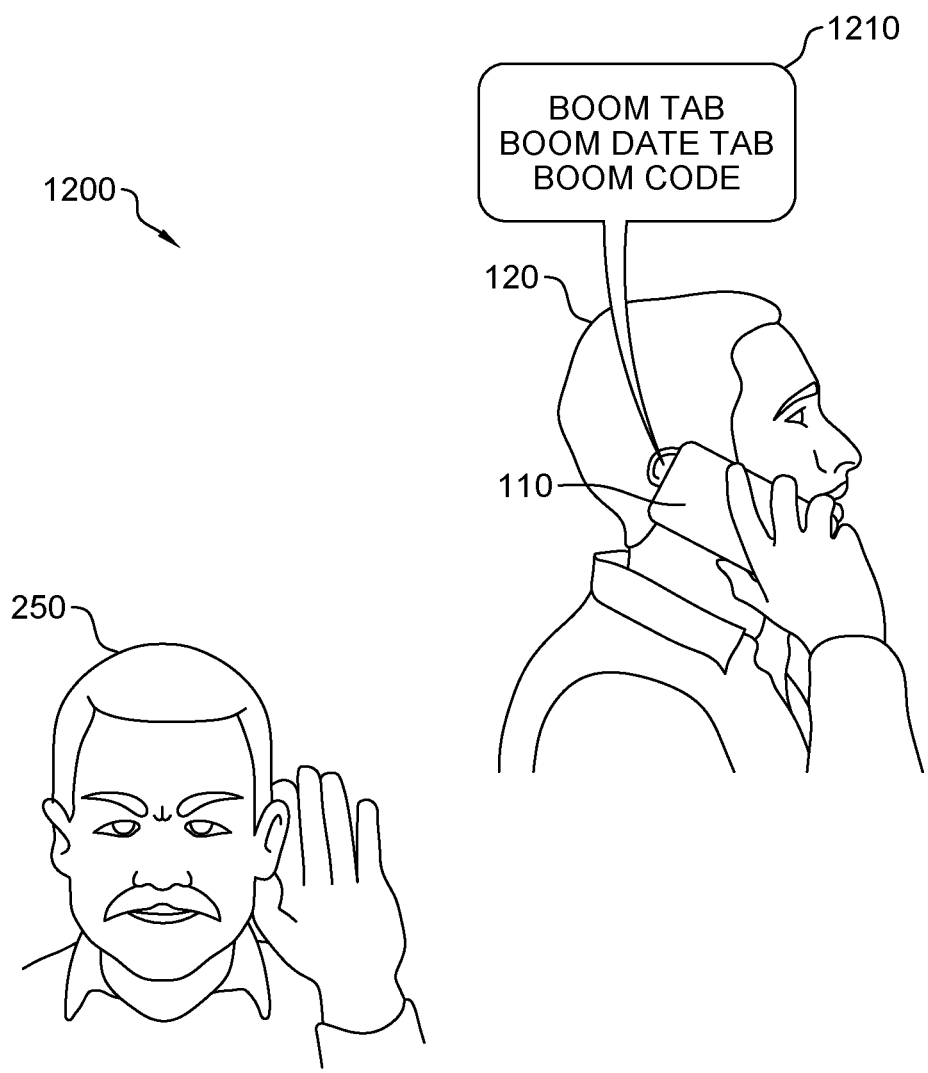
FIG. 12 shows a user interface diagram of a user interacting with a provider using a smartphone, according to an embodiment.

FIG. 12 shows a user interface diagram 1200 of a user interacting with a provider using a smartphone, according to an embodiment. In particular, FIG. 12 shows using a family of codewords. For example, the user 120 may use his or her smartphone 110, and an eavesdropper 250. However, the user may say the phrase 1210, which is "Boom Tab Boom Date Tab Boom Code." Here, Boom indicates that the family of codewords pertains to credit card information. Tab acts as a separator, and Date and Code are related to the credit card.

Hence, "Boom Tab Boom Date Tab Boom Code" maps to a credit card number, then the card's expiration date, then, the card's card verification value (CVV) code. In general, when using a family of codewords, the family uses a base codeword, such as "Boom" that identifies the family. Here, "Boom" refers to a credit card, but the family codeword could refer to other related information. "Tab" acts as a separator. "Date" and "Code" refer to aspects of the credit card.

As another example, a family of codewords could refer to address information for a user. For example, it could be "Torch Tab Torch City Tab Torch State Tab Torch Zip." Here, "Torch" could identify the street address and the "City," "State," and "Zip" could refer to other parts of the address, as appropriate, where "Tab" is still a separator.

Thus, the embodiments discussed herein may provide certain advantages. For example, using codewords as described in embodiments makes it much harder to intercept sensitive information. Using codewords may also make it easier to remember sensitive information. Also using families of codewords may help manage groups of information. Moreover, by muting the outgoing audio when a user recites the codeword, the provider receives only the sensitive information without being confused by the codeword.

Additional security safeguards may further improve security. For example, when a user uses a codeword, security may also require two-factor authentication, a particular caller, a particular voiceprint, or a particular location.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A codeword substitution system, comprising:
at least one processor, configured to:
prompt a user for a codeword at a phone, wherein the prompt includes a request for sensitive information from the user;
receive the codeword from the user spoken into the phone, in response to the request for the sensitive information;
recognize the codeword;
detect that the codeword is a family of codewords, including a base codeword, a separator, and at least one related codeword, wherein the separator is between the base codeword and the at least one related codeword;
map the family of codewords to the requested sensitive information, wherein the family of codewords is predefined by the user to be used as a substitute for the sensitive information;
generate audio corresponding to the sensitive information; and
transmit the audio over the phone to a service provider.

2. The system of claim 1, wherein the base codeword is a word associated with the sensitive information and a type of sensitive information.

3. The system of claim 1, wherein the at least one processor is further configured to:
- allow the user to define the base codeword to identify the family of codewords;
- associate the sensitive information with the at least one related codeword; and
- wherein the phone includes a memory that stores the association between the sensitive information provided by the user and the family of codewords.

4. The system of claim 1, wherein the at least one processor is further configured to mute the phone when the codeword is received from the user such that the service provider receives the audio corresponding to the sensitive information and not the codeword.

5. The system of claim 1, wherein the family of codewords is substituted together, including the base codeword and the at least one related codeword.

6. The system of claim 1, wherein the audio corresponding to the sensitive information is generated from a recording of a user saying the codeword.

7. The system of claim 1, wherein the audio corresponding to the sensitive information is generated using text-to-speech based on the codeword.

8. A codeword substitution method implemented by a processor of a phone executing instructions that configure the processor to perform the method comprising:
- prompting a user for a codeword at the phone, wherein the prompting includes a request for sensitive information from the user;
- receiving the codeword from the user spoken into the phone, in response to the request for the sensitive information;
- recognizing the codeword;
- detecting that the codeword is a family of codewords, including a base codeword, a separator, and at least one related codeword, wherein the separator is between the base codeword and the at least one related codeword;
- mapping the family of codewords to the requested sensitive information, wherein the family of codewords is predefined by the user to be used as a substitute for the sensitive information;
- generating audio corresponding to the sensitive information; and
- transmitting the audio over the phone to a service provider.

9. The method of claim 8, wherein the base codeword is a word associated with the sensitive information and a type of sensitive information.

10. The method of claim 8, wherein the instructions further configure the processor to:
- allow the user to define the base codeword to identify the family of codewords;
- associate the sensitive information with the at least one related codeword; and
- wherein the phone includes a memory that stores the association between the sensitive information provided by the user and the family of codewords.

11. The method of claim 8, wherein the instructions further configure the processor to mute the phone when the codeword is received from the user such that the service provider receives the audio corresponding to the sensitive information and not the codeword.

12. The method of claim 8, wherein the family of codewords is substituted together, including the base codeword and the at least one related codeword.

13. The method of claim 8, wherein the audio corresponding to the sensitive information is generated from a recording of a user saying the codeword.

14. The method of claim 8, wherein the audio corresponding to the sensitive information is generated using text-to-speech based on the codeword.

15. A codeword substitution method implemented by a processor of a phone executing instructions that configure the processor to perform the method comprising:
- listening to a user for a user signal for a codeword at the phone, wherein the user signal includes at least one of a keyword or a request for sensitive information from the user;
- receiving the codeword from the user spoken into the phone, in response to the user signal;
- recognizing the codeword;
- detecting that the codeword is a family of codewords, including a base codeword, a separator, and at least one related codeword, wherein the separator is between the base codeword and the at least one related codeword;
- mapping the family of codewords to the sensitive information, wherein the family of codewords is predefined by the user to be used as a substitute for the sensitive information;
- generating audio corresponding to the sensitive information; and
- transmitting the audio over the phone to a service provider.

16. The method of claim 15, wherein the base codeword is a word associated with the sensitive information and a type of sensitive information.

17. The method of claim 15, wherein the instructions further configure the processor to:
- allow the user to define the base codeword to identify the family of codewords;
- associate the sensitive information with the at least one related codeword; and
- wherein the phone includes a memory that stores the association between the sensitive information provided by the user and the family of codewords.

18. The method of claim 15, wherein the instructions further configure the processor to mute the phone when the codeword is received from the user such that the service provider receives the audio corresponding to the sensitive information and not the codeword.

19. The method of claim 15, wherein the family of codewords is substituted together, including the base codeword and the at least one related codeword.

20. The method of claim 15, wherein the audio corresponding to the sensitive information is generated from a recording of a user saying the codeword.

* * * * *